(12) United States Patent
Fujita et al.

(10) Patent No.: US 6,412,956 B2
(45) Date of Patent: Jul. 2, 2002

(54) IMAGE PROJECTION SYSTEM

(75) Inventors: Manabu Fujita; Yasuhiro Komiya; Masaki Higurashi; Fujio Kosaka, all of Hino; Akihiro Kubota, Kokubunji; Susumu Kobayashi, Sayama, all of (JP)

(73) Assignee: Olympus Optical Co., Ltd. (JP)

( * ) Notice: Subject to any disclaimer, the term of this patent is extended or adjusted under 35 U.S.C. 154(b) by 7 days.

(21) Appl. No.: 09/730,470

(22) Filed: Dec. 5, 2000

(51) Int. Cl.$^7$ .............................................. G03B 21/00
(52) U.S. Cl. ......................................... 353/122; 353/74
(58) Field of Search ............................. 353/74, 75, 76, 353/77, 122

(56) References Cited

U.S. PATENT DOCUMENTS

| | | | | |
|---|---|---|---|---|
| 4,997,271 A | * | 3/1991 | Shanks | 353/122 |
| 5,582,473 A | * | 12/1996 | Toide et al. | 353/74 |
| 6,305,806 B1 | * | 10/2001 | Hirakata | 353/122 |
| 2001/0022651 A1 | * | 9/2001 | Kubota et al. | 353/94 |

* cited by examiner

*Primary Examiner*—William Dowling
(74) *Attorney, Agent, or Firm*—Straub & Pokotylo; John C. Pokotylo

(57) ABSTRACT

An image projection system includes projection means for projecting an image on a transmission type screen from a rear surface side of the screen, standard image information generating means for generating standard image information of a standard image, image capturing means for capturing an image on the rear surface of the screen from an inside of a casing in which the projection means is housed, the image capturing means capturing the standard image projected onto the screen from the projection means, which receives the standard image information from the standard image information generating means, removing means for removing influences of external light from the standard image projected from the projection means onto the screen, correction value computing means for computing a correction value on the basis of image information of the standard image from which the influences of the external light are removed by the removing means, correction value storage means for storing the correction value information obtained by the correction value computing means, and correction means for correcting image information from a picture signal source by using the correction value information stored in the correction value storage means, and supplying the corrected image information to the projection means.

4 Claims, 5 Drawing Sheets

IMAGE PROJECTION SYSTEM

CROSS-REFERENCE TO RELATED APPLICATIONS

This application is based upon and claims the benefit of priority from the prior Japanese Patent Application No. 11-350443, filed Dec. 9, 1999, the entire contents of which are incorporated herein by reference.

BACKGROUND OF THE INVENTION

The present invention relates to an image projection system and, more particularly, to a calibration technique therefor.

A back projection type display apparatus has been available, which uses a transmission type screen and projects an image from the opposite surface side (rear surface side) to the observation surface side (front surface side) onto the screen by using a projector. As an advanced form of this system, a high-resolution back projection type large-screen display apparatus is also available, which projects a plurality of images from a plurality of projectors onto a screen to display them as one image.

In this back projection type large-screen display apparatus, since a plurality of projected images are joined into one image, the following measures must be taken.

First, this apparatus requires measures to correct distortion of each projected image. For this purpose, there have been provided a method of adjusting the angle of each projector to prevent each projected image from being distorted, and a method of giving an original image distortion that cancels out distortion of each projected image. Either of the methods requires means for detecting information about distortion of each projected image. For this purpose, a method using a digital camera and a method using a sensor placed on the screen have been proposed.

Second, this apparatus requires measures to perform correction associated with joining of projected images. For this purpose, a technique of smoothly joining images by overlapping adjacent images each other has been proposed. This technique, however, requires a means for detecting information about overlapping areas. For this purpose, a method of extracting a correction value from an image captured by a digital camera has been proposed.

Third, this apparatus requires measures to perform color correction of each projected image. For this purpose, a method has been proposed, in which a standard image is projected from a projector onto a screen, the overall projected standard image is captured by a digital camera, a correction value is extracted from the captured standard image, and color correction is performed by using this correction value.

Correction value acquiring operation (adjustment processing) for performing the above series of correcting operations will be referred to as calibration. This calibration is performed when the image projection system is influenced by age-based change as well as system installation.

The conventional image projection system is, however, designed to execute calibration while placing the digital camera on the front surface side of the screen. For this reason, in executing calibration, a user must adjust the installation position, angle, focus, and the like of the digital camera, imposing a heavy load on the user in adjustment.

The digital camera may be fixed in advance on the rear surface side of the screen to reduce the load of adjustment on the user in executing calibration. In this arrangement, however, an image on the screen is captured in a direction different from the direction (front surface side) in which the user sees the image projected on the screen, and hence it is difficult to perform appropriate adjustment.

BRIEF SUMMARY OF THE INVENTION

The present invention has been made to solve the above problems, and has as its object to provide a back projection type image projection system which allows appropriate adjustment when the digital camera used for calibration is installed on the rear surface side of the screen.

According to the present invention, there is provided an image projection system comprising projection means for projecting an image on a transmission type screen from a rear surface side of the screen, standard image information generating means for generating standard image information of a standard image, image capturing means for capturing an image on the rear surface of the screen from an inside of a casing in which the projection means is housed, the image capturing means capturing the standard image projected onto the screen from the projection means, which receives the standard image information from the standard image information generating means, removing means for removing influences of external light from the standard image projected from the projection means onto the screen, correction value computing means for computing a correction value on the basis of image information of the standard image from which the influences of the external light are removed by the removing means, correction value storage means for storing the correction value information obtained by the correction value computing means, and correction means for correcting image information from a picture signal source by using the correction value information stored in the correction value storage means, and supplying the corrected image information to the projection means.

In the above image projection system, the removing means may have a function of blocking the external light that reaches the image capturing means through the screen.

In the above image projection system, the removing means may have a computing function of removing the influences of the external light on the basis of image information obtained by capturing an image on the screen by using the image capturing means while the standard image is projected from the projection means onto the screen and image information obtained by capturing an image on the screen by using the image capturing means while the standard image is not projected from the projection means onto the screen.

The above image projection system may further comprise means for storing information based on image information obtained by capturing an image on the screen from the rear surface side of the screen while the standard image is projected from the projection means onto the screen and image information obtained by capturing an image on the screen from the front surface side of the screen while the standard image is projected from the projection means onto the screen.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described below with reference to the views of the accompanying drawing.

[First Embodiment]

(Arrangement of Apparatus)

Figure 1:
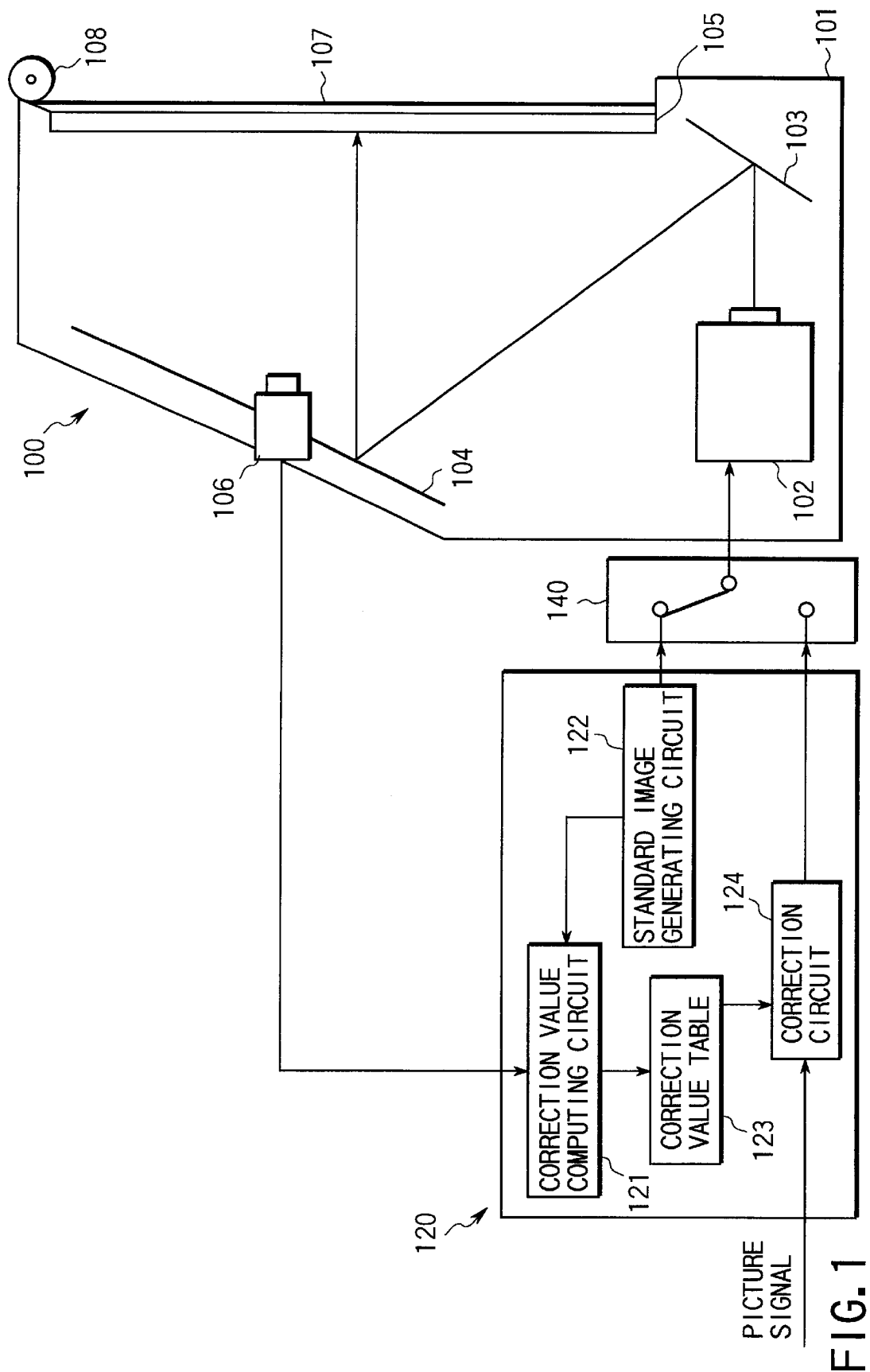
FIG. 1 is a view showing an example of the basic arrangement of an image projection system according to the first embodiment of the present invention.

FIG. 1 is a view showing an example of the basic arrangement of an image projection system according to the first embodiment. This image projection system is a back projection type image projection system designed to project images from a plurality of projectors from the rear surface side of a transmission type screen onto the screen to display the images as one image. Similar image projection systems are assumed in other embodiments unless otherwise specified.

Projectors 102 are mounted in a casing 101 of a display section 100. Although only one projector is shown in FIG. 1, a plurality of projectors are arranged in practice. An image emerging from this projector 102 is projected on a transmission type screen 105 via mirrors 103 and 104. A digital camera 106 is fixed at a predetermined position in the casing 101 so as to capture an image on the rear surface of the screen 105 from the inside of the casing 101.

The display section 100 has a shielding sheet (light-shielding sheet) 107 that can cover the entire surface of the screen 105. With this shielding sheet 107, external light entering from the front surface side of the screen 105 into the casing can be blocked. Since the shielding sheet 107 can be taken up by a take-up roller 108, the sheet can cover the entire surface of the screen 105, as needed. Since external light is blocked by the casing 101 except for a portion where the screen 105 is disposed, the influences of external light on the digital camera 106 can be removed by fully closing the shielding sheet 107. Note that an openable shielding door may be used in place of the shielding sheet to block external light. In addition, the shielding sheet or door may be used for the protection of the screen or an ornamental purpose while the display section is not used.

The output terminal of the digital camera 106 is connected to a processing section 120 and can transmit the image data of a captured image to the processing section 120 by a general serial communication interface such as IEEE1394 or RS232C.

The image data output from the digital camera 106 is input to a correction value computing circuit 121 of the processing section 120 through the above serial communication interface. A standard image generating circuit 122 is connected to this correction value computing circuit 121. The correction value computing circuit 121 performs predetermined correction value computation processing on the basis of the image data from the digital camera 106 and standard image data from the standard image generating circuit 122. In performing adjustment processing (calibration), the shielding sheet 107 is fully closed, and a standard image is projected from the projector 102 onto the screen 105. A correction value corresponding to the difference between the image data of the standard image captured by the digital camera 106, from which the influences of external light are removed, and the standard image data from the standard image generating circuit 122 is obtained by the correction value computation processing.

A correction value table 123 is connected to the correction value computing circuit 121. The correction value data obtained by the correction value computing circuit 121 is stored in the correction value table 123. This correction value table 123 can be formed by using a rewritable non-volatile memory such as an EEPROM.

A correction circuit 124 is connected to the correction value table 123. A picture (moving picture) signal (picture data) is input to the correction circuit 124, which corrects the picture signal by using the correction value data stored in the correction value table 123.

The picture signal output from the correction circuit 124 is input to the projector 102 through a switch 140. If the switch 140 is placed on the standard image generating circuit 122 side, the standard image data from the standard image generating circuit 122 is input to the projector 102.

(Operation)

The operation of this embodiment will be described next.

In adjustment processing (calibration), the switch 140 is switched to the standard image generating circuit 122 side. In addition, the shielding sheet 107 is pulled out from the take-up roller 108 to cover the entire surface of the screen 105 to prevent any external light from entering the casing 101.

Subsequently, a standard image is projected from the projector 102 onto the screen 105, and the standard image projected on the screen 105 is captured by the digital camera 106. The image data of the captured standard image is transmitted to the correction value computing circuit 121. The correction value computing circuit 121 calculates a correction value from the image data of the standard image sent from the digital camera 106, from which the influences of external light are removed, and the standard image data from the standard image generating circuit 122. The obtained correction value data is stored in the correction value table 123. The switch 140 is switched to the correction circuit 124 side to terminate the adjustment processing.

When a picture (moving picture) is to be actually projected on the screen, the shielding sheet 107 is taken up by the take-up roller 108 to allow a user to see the picture from the front surface side of the screen 105. In this state, a picture signal is input to the correction circuit 124. The input picture signal is corrected by using the correction value data stored in the correction value table 123. An image based on the corrected picture signal is then projected from the projector 102 onto the screen 105.

As described above, in this embodiment, since the influences of external light are removed by using the shielding member such as the shielding sheet, when a digital camera for capturing a standard image is placed on the rear surface side of the screen to capture a standard image, appropriate correction data can be obtained, and appropriate adjustment can be performed.

[Second Embodiment]
(Arrangement of Apparatus)

Figure 2:
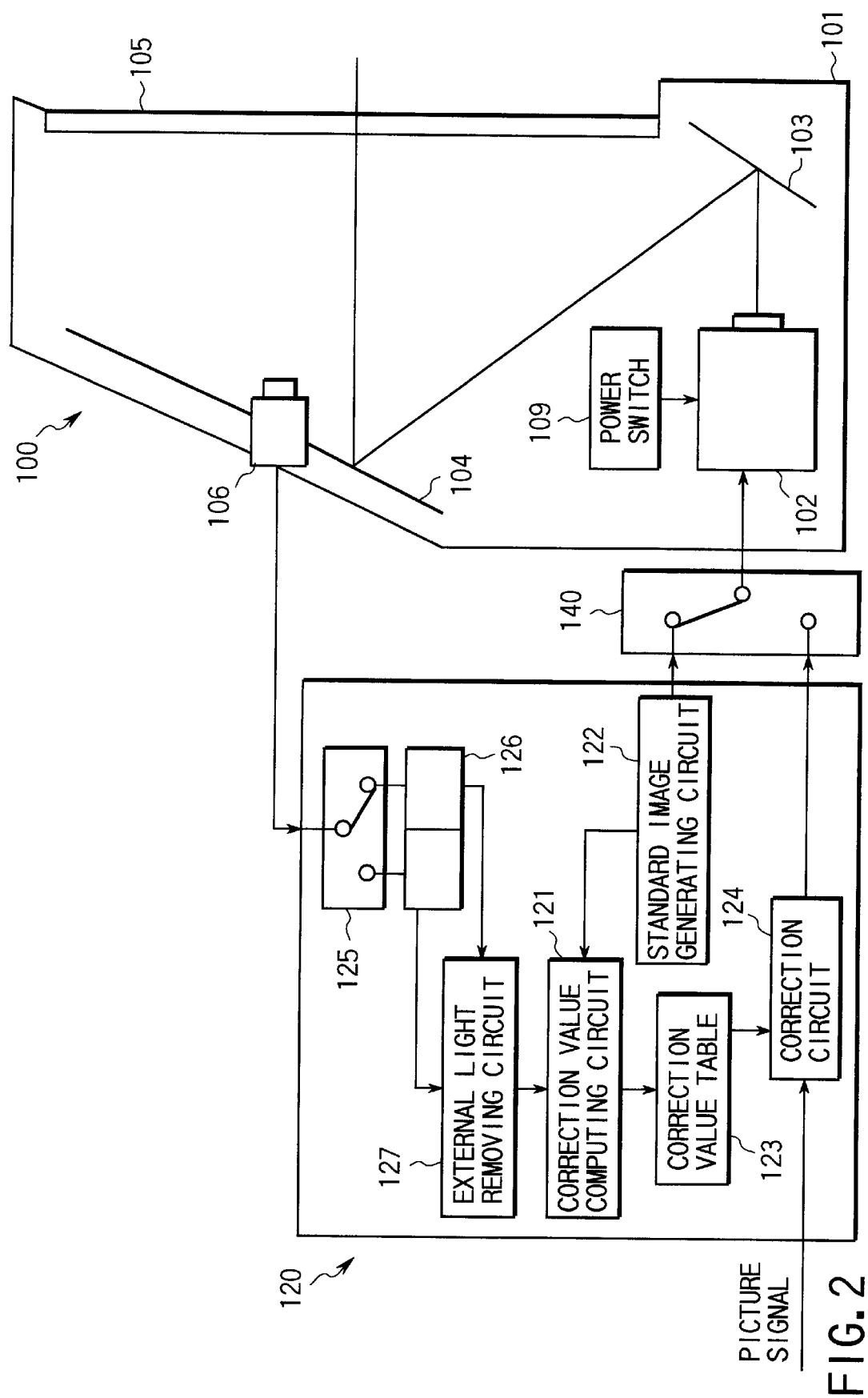
FIG. 2 is a view showing an example of the basic arrangement of an image projection system according to the second embodiment of the present invention.

FIG. 2 is a view showing an example of the basic arrangement of an image projection system according to the second embodiment. Note that the same reference numerals as in FIG. 1 denote the same parts in FIG. 2.

The basic arrangement of a display section 100 is the same as that of the first embodiment shown in FIG. 1. In the first embodiment, however, the influences of external light are mechanically removed by using the shielding sheet. In the second embodiment, the influences of external light are removed by processing in a processing section 120. For this purpose, a projector 102 is turned on/off by a power switch 109 to perform adjustment processing.

More specifically, the power switch 109 is turned off to prohibit the projector 102 from projecting any image onto a screen 105 (while setting the light amount of the projector 102 to zero), and the screen 105 is image-captured by a digital camera 106. Alternatively, the power switch 109 is turned on to make the projector 102 project a standard image onto the screen 105, and the screen 105 is image-captured by the digital camera 106. Note that a relay or the like can be used as the power switch 109, which can be electrically controlled.

With regard to the processing section 120 and a switch 140 as well, the basic arrangement of a correction value computing circuit 121, standard image generating circuit 122, correction value table 123, and correction circuit 124 is the same as that in the first embodiment shown in FIG. 1. In the second embodiment, however, the influences of external light are removed by processing in the processing section 120, and hence the processing section 120 includes a bank switching circuit 125, frame memory 126, and external light removing circuit 127.

Image data output from the digital camera 106 is input to the bank switching circuit 125. The bank switching circuit 125 switches the storage locations of the frame memory 126 with respect to two image data output from the digital camera 106 in accordance with the ON and OFF states of the power switch 109. The frame memory 126 is connected to the external light removing circuit 127. The external light removing circuit 127 performs a computation for removing the influences of external light by using the two image data stored in the frame memory 126.

(Operation)

The operation of this embodiment will be described next.

In adjustment processing (calibration), first of all, the power switch 109 is turned off to set the light amount of the projector 102 to zero and prohibit the projector 102 from projecting any image onto the screen 105. In this state, the screen 105 is image-captured by the digital camera 106 from the rear surface side. The image data of the captured image is stored in one of the banks of the frame memory 126 through the bank switching circuit 125. In this manner, image data in which only external light components are influenced can be obtained.

The power switch 109 is then turned on to supply standard image data from the standard image generating circuit 122 to the projector 102 through the switch 140 and project a standard image from the projector 102 onto the screen 105. In this state, the screen 105 is image-captured by the digital camera 106 from the rear surface side. The image data of the captured standard image is stored in the other bank of the frame memory 126 through the bank switching circuit 125. In this manner, the image data of the standard image in which external light components are influenced can be obtained.

Subsequently, the external light removing circuit 127 performs arithmetic processing by using the two image data stored in the two banks of the frame memory 126 to obtain the image data of a standard image from which the influences of external light components are removed. Both the two image data stored in the two banks of the frame memory 126 contain external light components. For this reason, by using arithmetic processing using the two image data, the image data of a standard image from which the influences of external light components are removed can be obtained.

The image data of the standard image obtained by the external light removing circuit 127, from which the influences of external light are removed, is sent to the correction value computing circuit 121. The correction value computing circuit 121 calculates a correction value from the image data of the standard image from the external light removing circuit 127, from which the influences of external light are removed, and the standard image data from the standard image generating circuit 122. The obtained correction value data is stored in the correction value table 123. In addition, the switch 140 is switched to the correction circuit 124 side to terminate the adjustment processing.

When a picture is to be actually projected onto the screen, a picture signal is input to the correction circuit 124. The input picture signal is corrected by using the correction value data stored in the correction value table 123, and an image based on the corrected picture signal is projected from the projector 102 onto the screen 105.

In the above case, in adjustment processing, the power switch 109 is turned on and off, and the screen 105 is image-captured once in each of the ON and OFF states. However, the screen 105 may be image-captured a plurality of number of times in each of the ON and OFF states, and weighted mean processing may be performed to improve the precision.

As described above, in this embodiment, since the influences of external light are removed by the external light removing circuit, when a standard image is to be captured by arranging a digital camera for standard image capturing operation on the rear surface side of the screen, appropriate correction data can be acquired, and appropriate adjustment can be performed.

(Functional Arrangement and Flow Chart)

Figure 3:
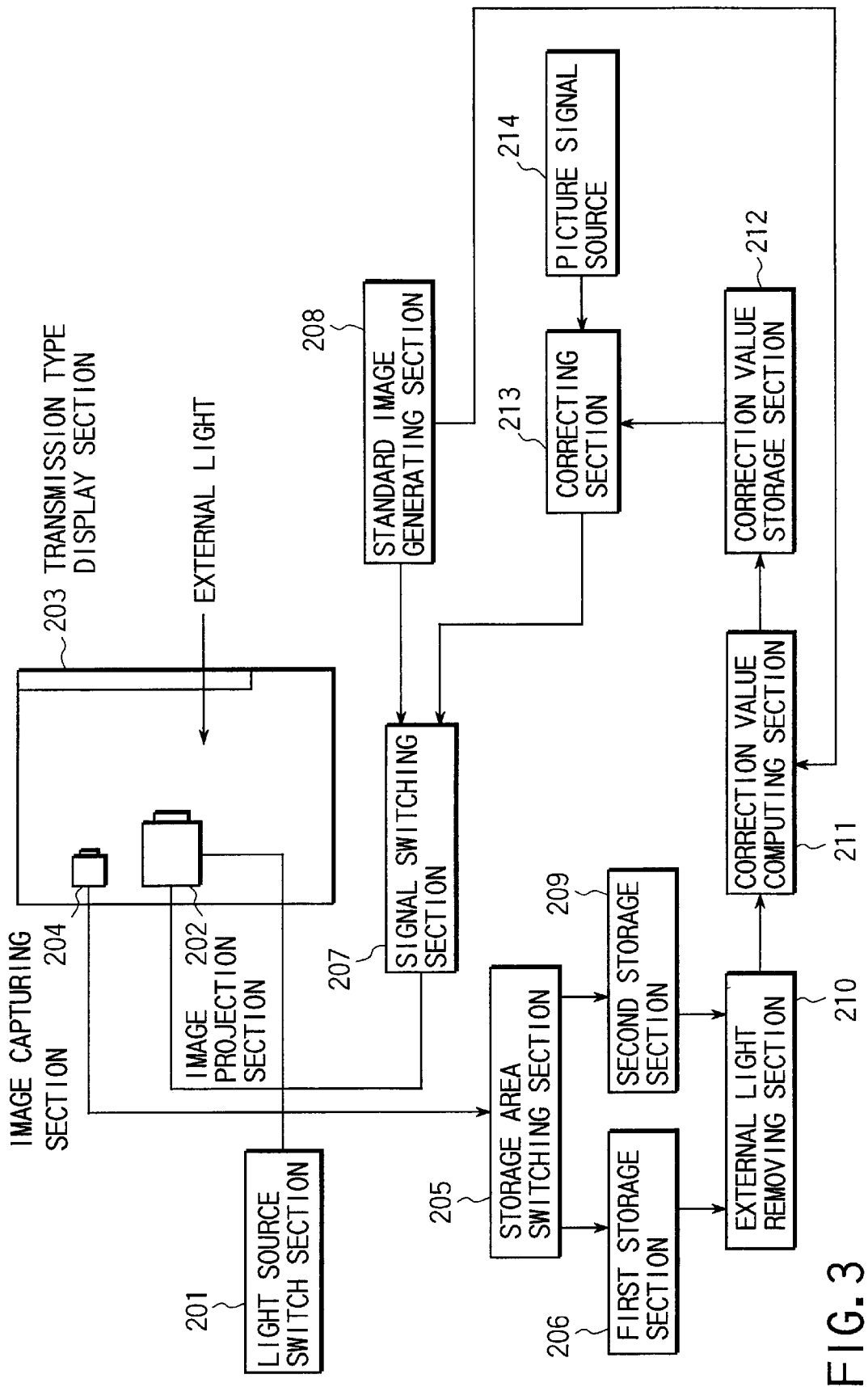
FIG. 3 is a view showing the functional arrangement of the image projection system according to the second embodiment of the present invention.
Figure 4:
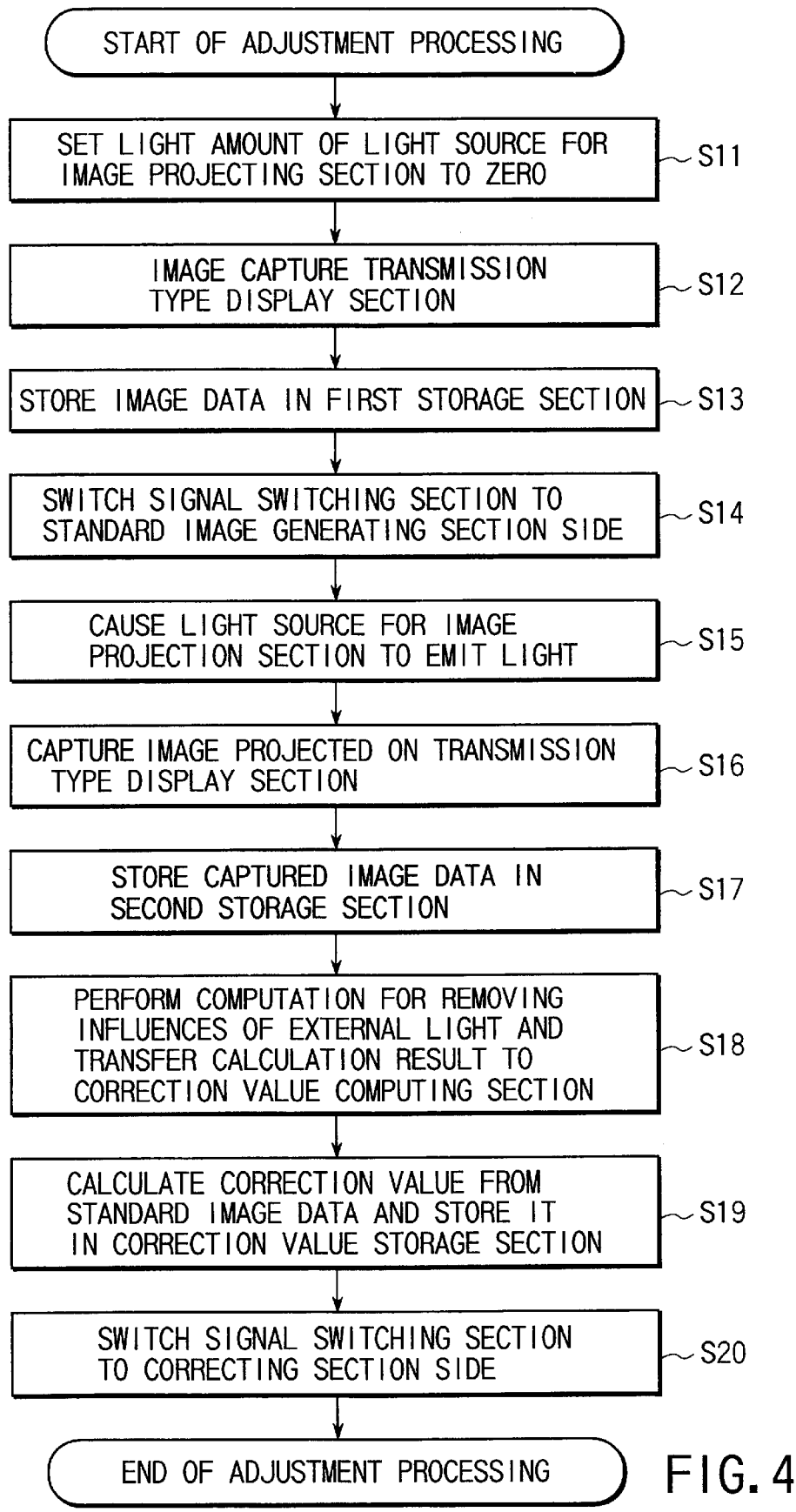
FIG. 4 is a flow chart showing the operation of the arrangement in FIG. 3.

FIG. 3 is a view showing the functional arrangement of the image projection system according to the second embodiment. FIG. 4 is a flow chart showing the operation of the arrangement in FIG. 3. A description will be made with reference to FIGS. 3 and 4.

In adjustment processing, a light source switch section 201 is turned off to set the light amount of an image projection section 202 to zero to prohibit the image projection section 202 from projecting any image onto a transmission type display section 203 (step S11). Subsequently, the transmission type display section 203 is image-captured by an image capturing section 204 from the rear surface side (step S12). The image data of the captured image is stored in a first storage section 206 through a storage area switching section 205 (step S13).

A signal switching section 207 is then switched to the standard image generating section 208 side (step S14). The light source switch section 201 is turned on to cause the light source of the image projection section 202 to emit light, thereby projecting a standard image on the transmission type display section 203 (step S15). The transmission type display section 203 is then image-captured by the image capturing section 204 from the rear surface side (step S16). The image data of the captured image is stored in a second storage section 209 (step S17).

A computation for removing the influences of external light is performed by an external light removing section 210 using the image data stored in the first storage section 206 and second storage section 209, and the computation result is transferred onto a correction value computing section 211 (step S18).

Subsequently, the correction value computing section 211 calculate a correction value from the image data of the standard image from the external light removing section 210, from which the influences of external light are removed, and the standard image data from the standard image generating section 208. The obtained correction value is stored in a correction value storage section 212 (step S19).

Lastly, the signal switching section 207 is switched to the correcting section 213 side (step S20). With this operation, when a picture is to be actually projected on the transmission type display section 203, a signal from a picture signal source 214 is corrected by the correcting section 213, and an image based on the corrected picture signal is projected from the image projection section 202 onto the transmission type display section 203.

[Third Embodiment]
(Arrangement of Apparatus)

Figure 5:
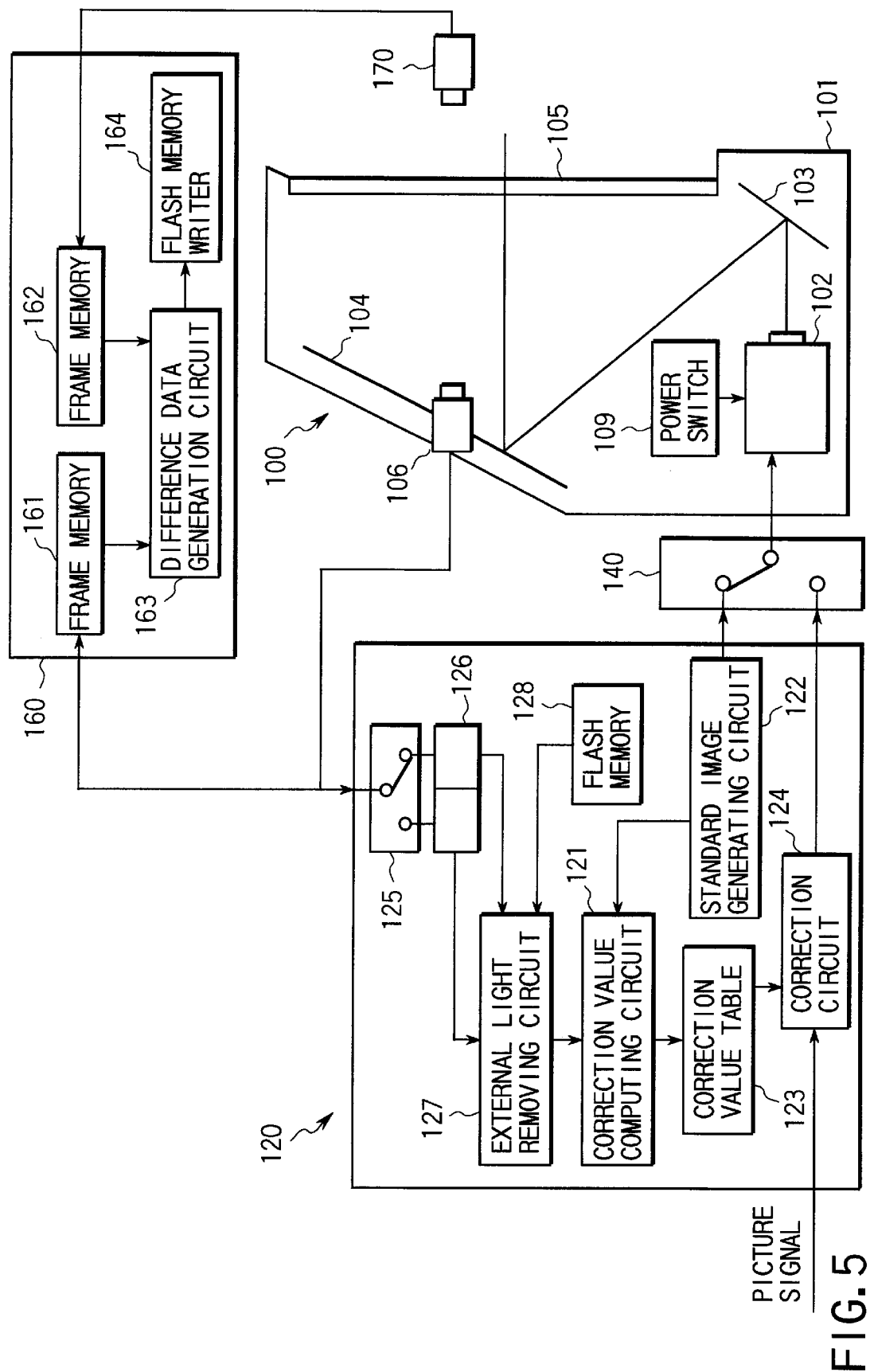
FIG. 5 is a view showing an example of the basic arrangement of an image projection system according to the third embodiment of the present invention.

FIG. 5 is a view showing an example of the basic arrangement of an image projection system according to the third embodiment. In addition to the arrangement of the second embodiment in FIG. 2, the third embodiment includes new constituent elements. The same reference numerals as in FIG. 2 denote the same parts as in FIG. 5.

The basic arrangements of a display section 100, processing section 120, and switch 140 are the same as those in the second embodiment shown in FIG. 2. In the third embodiment, the processing section 120 incorporates a flash memory 128 as a non-volatile memory.

The flash memory 128 is used to correct the difference between an image seen from the rear surface side of a screen 105 and an image seen from the front surface side (observation surface side). When an image is projected from a projector 102 onto the screen 105, the image seen from the rear surface side of the screen 105 differ in image characteristics from the image seen from the front surface side. For this reason, prior to shipment, correction data is generated and stored in the flash memory 128 in advance.

An inspection unit 160 generates correction data and writes it in the flash memory 128. This inspection unit 160 is comprised of frame memories 161 and 162, difference data generating circuit 163, and flash memory writer 164.

The frame memory 161 stores the image data obtained by capturing a standard image from the rear surface side of the screen 105 using the digital camera 106. The frame memory 162 stores the image data obtained by capturing a standard image from the front surface side of the screen 105 using a digital camera 170. The difference data generating circuit 163 is connected to the frame memories 161 and 162. The difference data generating circuit 163 computes the difference between the image data stored in the frame memories 161 and 162. The flash memory writer 164 is connected to the difference data generating circuit 163. The flash memory writer 164 writes the difference data obtained by the difference data generating circuit 163 in the flash memory 128.

(Operation)

The operation of this embodiment will be described next.

At the time of shipment, correction data (difference data) is written in the flash memory 128. First of all, a standard image is projected from the projector 102 onto the screen 105 in a place with no influences of external light, e.g., a dark room, and standard images are captured by the digital cameras 106 and 170 from the rear surface side and front surface side of the screen 105, respectively. The obtained standard image data are respectively stored in the frame memories 161 and 162. Subsequently, the difference data generating circuit 163 generates difference data from these standard image data, and the flash memory writer 164 writes the difference data in the flash memory 128. The flash memory 128 in which the difference data is written is mounted in the processing section 120.

The basic operation of the factory-shipped image projection system is the same as that in the second embodiment. Note, however, that since difference data is stored in the flash memory 128, the difference data stored in the flash memory 128 is also referred to when the external light removing circuit 127 performs arithmetic processing in adjustment processing.

In the above case, the flash memory writer 164 in the inspection unit 160 writes difference data in the flash memory 128. However, the processing section 120 may have the function of writing data in the flash memory 128. In this case, the difference data obtained by the inspection unit 160 is transmitted to the processing section 120 and written in the flash memory 128 mounted in the processing section 120.

As described above, according to this embodiment, standard images are captured from the rear surface side and front surface side of the screen, and the difference data between the respective standard images is stored in the flash memory in advance. This makes it possible to correct the difference in image characteristics between the images on the rear and front surface sides and perform more appropriate adjustment.

As described above, according to the present invention, when the image capturing means for capturing a standard image is placed on the rear surface side of the screen to capture a standard image, appropriate correction data can be obtained by removing the influences of external light. Hence, appropriate adjustment can be made.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image projection system comprising:

projection means for projecting an image on a transmission type screen from a rear surface side of the screen;

standard image information generating means for generating standard image information of a standard image;

image capturing means for capturing an image on the rear surface of the screen from an inside of a casing in which said projection means is housed, said image capturing means capturing the standard image projected onto the screen from said projection means, which receives the standard image information from said standard image information generating means;

removing means for removing influences of external light from the standard image projected from said projection means onto the screen;

correction value computing means for computing a correction value on the basis of image information of the standard image from which the influences of the external light are removed by said removing means;

correction value storage means for storing the correction value information obtained by said correction value computing means; and correction means for correcting image information from a picture signal source by using the correction value information stored in said correction value storage means, and supplying the corrected image information to said projection means.

2. A system according to claim 1, wherein said removing means has a function of blocking the external light that reaches said image capturing means through the screen.

3. A system according to claim 1, wherein said removing means has a computing function of removing the influences of the external light on the basis of image information obtained by capturing an image on the screen by using said image capturing means while the standard image is projected from said projection means onto the screen and image information obtained by capturing an image on the screen by using said image capturing means while the standard image is not projected from said projection means onto the screen.

4. A system according to claim 1, further comprising means for storing information based on image information obtained by capturing an image on the screen from the rear surface side of the screen while the standard image is projected from said projection means onto the screen and image information obtained by capturing an image on the screen from the front surface side of the screen while the standard image is projected from said projection means onto the screen.

* * * * *